M. S. LOGAN.
BICYCLE.
APPLICATION FILED APR. 15, 1914.
1,139,045.
Patented May 11, 1915.
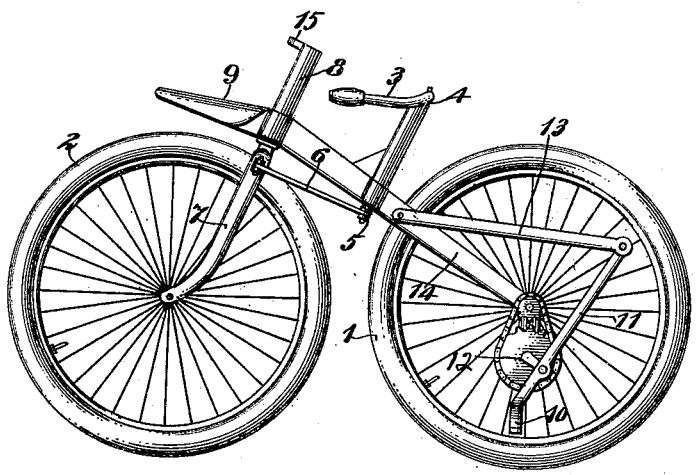
Witnesses:
Inventor:
Maurice Samuel Logan

UNITED STATES PATENT OFFICE.

MAURICE SAMUEL LOGAN, OF BROOKLYN, NEW YORK.

BICYCLE.

1,139,045. Specification of Letters Patent. Patented May 11, 1915.

Application filed April 15, 1914. Serial No. 831,943.

*To all whom it may concern:*

Be it known that I, MAURICE SAMUEL LOGAN, a subject of Canada, residing in the United States at No. 25 Ashland place, in the city of Brooklyn, county of Kings, and State of New York, have invented a new and useful Improvement in Bicycles.

The object of my improvement is to secure close coupling between the fore and aft wheels together with the lowest practical position of the rider's seat.

I attain this object by the mechanism illustrated in the accompanying drawing.

1 is the fore or propelling wheel; 2 is the aft or steering wheel; 3 is an end view of the handle bar, extending crosswise of the handle bar shaft 4. Said shaft is provided at its lower end—on either side—with short lateral arms 5, which are connected, by rods 6, to the shoulders of the fork 7, of the steering wheel 2, by means of which the said fork is turned about in its swivel bearing in the tube 8. The said arms 5—on either side—may be connected to the fork 7, crosswise, by crossing the rods 6. 9 is the rider's seat; 10 is the pedal; 11 is the crank lever which turns the propelling crank 12; 13 is the compensating arm which allows for the vertical motion of the propelling crank; 14 is the fork in which the wheel 1 is mounted; 15 is an eyelet or hook for receiving a corresponding eyelet or hook connected to a belt or shoulder-brace worn by the rider.

The speed gearing, shown in the illustration, may be dispensed with, and the propelling crank 12, attached directly to the axle of the propelling wheel 1.

I claim:

The reverse side of the bicycle is the counterpart of the side shown.

The combination in a bicycle of the aft wheel mounted in a fork, said fork attached to the frame by a swivel bearing located forward of the rider's seat, the handle bar, and means controlled thereby, for turning said fork about in said bearing, substantially as shown and described

MAURICE SAMUEL LOGAN.

Witnesses:
 HUGH J. WARD,
 BERNARD ZEKOWSKI.

Copies of this patent may be obtained for five cents each, by addressing the "Commissioner of Patents, Washington, D. C."

It is hereby certified that in Letters Patent No. 1,139,045, granted May 11, 1915, upon the application of Maurice Samuel Logan, of Brooklyn, New York, for an improvement in "Bicycles," an error appears in the printed specification requiring correction as follows: Strike out line 38, and after line 40 as now numbered insert the words *I claim:* and that the said Letters Patent should be read with this correction therein that the same may conform to the record of the case in the Patent Office.

Signed and sealed this 30th day of November, A. D., 1915.

[SEAL.]

Cl. 208—114.

J. T. NEWTON,
*Acting Commissioner of Patents.*